(12) United States Patent
Miller

(10) Patent No.: US 8,103,666 B1
(45) Date of Patent: Jan. 24, 2012

(54) VARIABLE AUDIO/VISUAL DATA INCORPORATION SYSTEM AND METHOD

(76) Inventor: Frank W. Miller, Gulfport, FL (US)

( * ) Notice: Subject to any disclaimer, the term of this patent is extended or adjusted under 35 U.S.C. 154(b) by 787 days.

(21) Appl. No.: 12/194,138

(22) Filed: Aug. 19, 2008

(51) Int. Cl.
G06F 17/30 (2006.01)
(52) U.S. Cl. ...................................................... 707/732
(58) Field of Classification Search .......... 707/705–710, 707/732–734, 755–758; 455/465, 466; 701/209–211
See application file for complete search history.

(56) References Cited

U.S. PATENT DOCUMENTS

| | | | |
|---|---|---|---|
| 5,897,617 A | 4/1999 | Collier | |
| 5,933,811 A | 8/1999 | Angles et al. | |
| 6,009,410 A | 12/1999 | LeMole et al. | |
| 7,020,623 B1 | 3/2006 | Tiley et al. | |
| 7,123,696 B2 | 10/2006 | Lowe | |
| 7,142,645 B2 | 11/2006 | Lowe | |
| 7,360,230 B1 | 4/2008 | Paz et al. | |
| 2002/0099798 A1 | 7/2002 | Fedorovsky et al. | |
| 2002/0128906 A1 | 9/2002 | Belth | |
| 2003/0040966 A1 | 2/2003 | Belth | |
| 2004/0107169 A1 | 6/2004 | Lowe | |
| 2006/0074769 A1 | 4/2006 | Looney et al. | |
| 2008/0096588 A1* | 4/2008 | Waytena et al. | 455/466 |
| 2008/0273079 A1* | 11/2008 | Campbell et al. | 348/14.08 |
| 2009/0119013 A1* | 5/2009 | O'Malley | 701/211 |

FOREIGN PATENT DOCUMENTS

WO 2006029681 A2 3/2006

* cited by examiner

Primary Examiner — Wilson Lee
(74) Attorney, Agent, or Firm — Burns & Levinson LLP; Orlando Lopez

(57) ABSTRACT

A system and method that allow a one:many relationship between personalization/positioning/targeting of audio/visual information and a produced audio/visual message.

19 Claims, 4 Drawing Sheets

VARIABLE AUDIO/VISUAL DATA INCORPORATION SYSTEM AND METHOD

BACKGROUND

In a competitive commercial world, companies look for ways to distinguish their products and services from their competitors' products and services. In general, organizations look for unique ways to get the attention of their audiences through informational communications such as advertising, public service, or other announcements. One such way is to personalize and target the providing of information about products and services. An example of targeted communication is telephone and e-mail messages including personalization.

A problem with traditional variable data systems is that there is a one:one relationship between personalization/positioning/targeting and the produced piece so that, for example, to personalize a phone message or e-mail message would require stored audio/visual information about each target customer.

What is needed are a system and method that allow a one:many relationship between personalization/targeting and the produced message.

SUMMARY

The variable audio/visual data incorporation system and method of the present invention augment traditional variable audio/visual data incorporation systems by providing generic files that can be reused for creating personalized/customized messages. In this way, a user may create a message and a generic personalization/customization file of, for example, recordings, for example, a file of audio recordings of a generic set of first names, such that the user may select from the generic personalization/customization file an element that matches a customer characteristic, for example a first name, and combine that selection with the message to a produce personalized message. If there is no match in the generic personalization/customization file, then a default entry could be used to complete the message, or the customer characteristic could be formatted and entered into the generic file.

A method for providing a personalized informational piece can include, but is not limited to including, the steps of (a) creating, on a computer, a customer database having entries; (b) creating, on the computer, a characteristic database having a set of predefined audio/video characteristic data unrelated to the customer database; (c) identifying a recipient characteristic as one of the entries from the customer database; (d) selecting, from the set of predefined audio/video characteristic data, at least one variable section that includes a match between the recipient characteristic and one of the set of predefined audio/video characteristic data, if possible; (e) updating the characteristic database with an audio/video form of the recipient characteristic if the match is not found, and repeating step (d); (f) accessing, on the computer, an audio/video informational piece; (g) creating, on the computer, the personalized informational piece that includes a combination of the at least one variable section and the audio/video informational piece; (h) testing, on the computer, the personalized informational piece; and (i) providing the personalized informational piece to a medium.

For a better understanding of the present invention, together with other and further objects thereof, reference is made to the accompanying drawings and detailed description.

DETAILED DESCRIPTION

Figure 1:
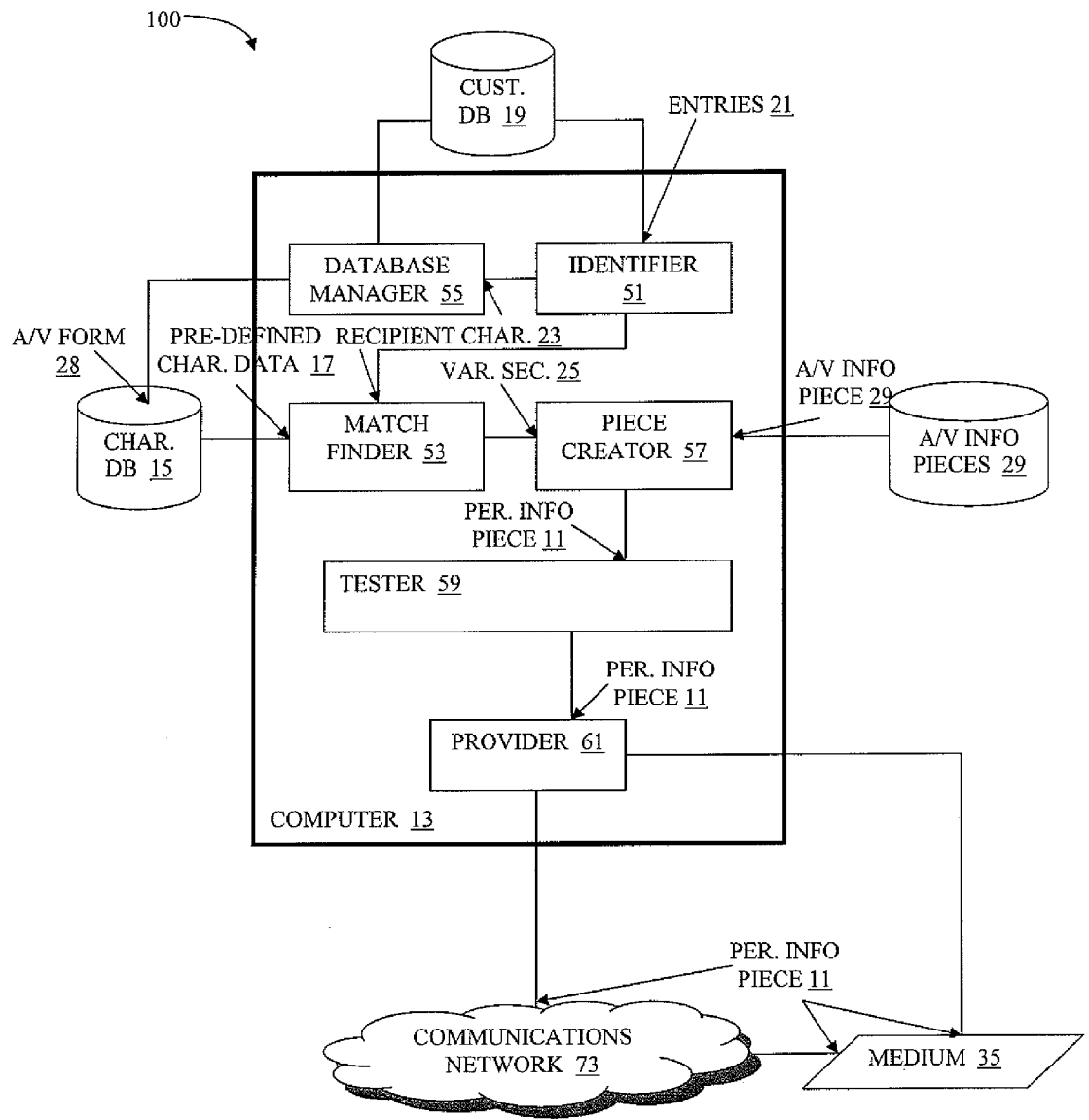
FIG. 1 is a schematic block diagram of an illustrative embodiment of the system of the present invention can execute.

Embodiments according to the present teachings are now described more fully hereinafter with reference to the accompanying drawings. The following configuration description is presented for illustrative purposes only. Any computer configuration with the capacity to meet the performance and storage requirements of the system and method of the present embodiment Referring now to FIG. 1, system 100 for providing a personalized informational piece 11 can include, but is not limited to including, computer 13, and customer database 19 electronically communicating with computer 13. Customer database 19 can include entries 21. System 100 can further include characteristic database 15 electronically communicating with computer 13. Characteristic database 15 can include a set of predefined audio/video characteristic data 17 unrelated to customer database 19. System 100 can still further include identifier 51 executing within computer 13 for identifying recipient characteristic 23 as one of entries 21 from customer database 19, match finder 53 executing within computer 13 for selecting, from the set of predefined audio/video characteristic data 17, at least one variable section 25 that includes a match between recipient characteristic 23 and one of the set of predefined audio/video characteristic data 17, if possible. System 100 can even still further include database manager 55 executing within computer 13 for updating characteristic database 15 with audio/video form 28 of recipient characteristic 23 if the match is not found, and piece creator 57 executing within computer 13 for accessing audio/video informational piece 29 and for creating personalized informational piece 11 that includes a combination of at least one variable section 31 and audio/video informational piece 29. System 100 can further include tester 59 executing within computer 13 for testing personalized informational piece 11, and provider 61 executing within computer 13 for providing personalized informational piece 11 to medium 35. Provider 61 can be in electronic communication with medium 35. Predefined audio/video characteristic data 17 can optionally include, for example, recordings of first names and/or non-English language first names. Customer database 19 can include, for example, customer names, customer phone numbers, and customer e-mail addresses. Audio/video informational piece 29 can include, for example, an audio informational piece and/or a video informational piece.

Figure 2:
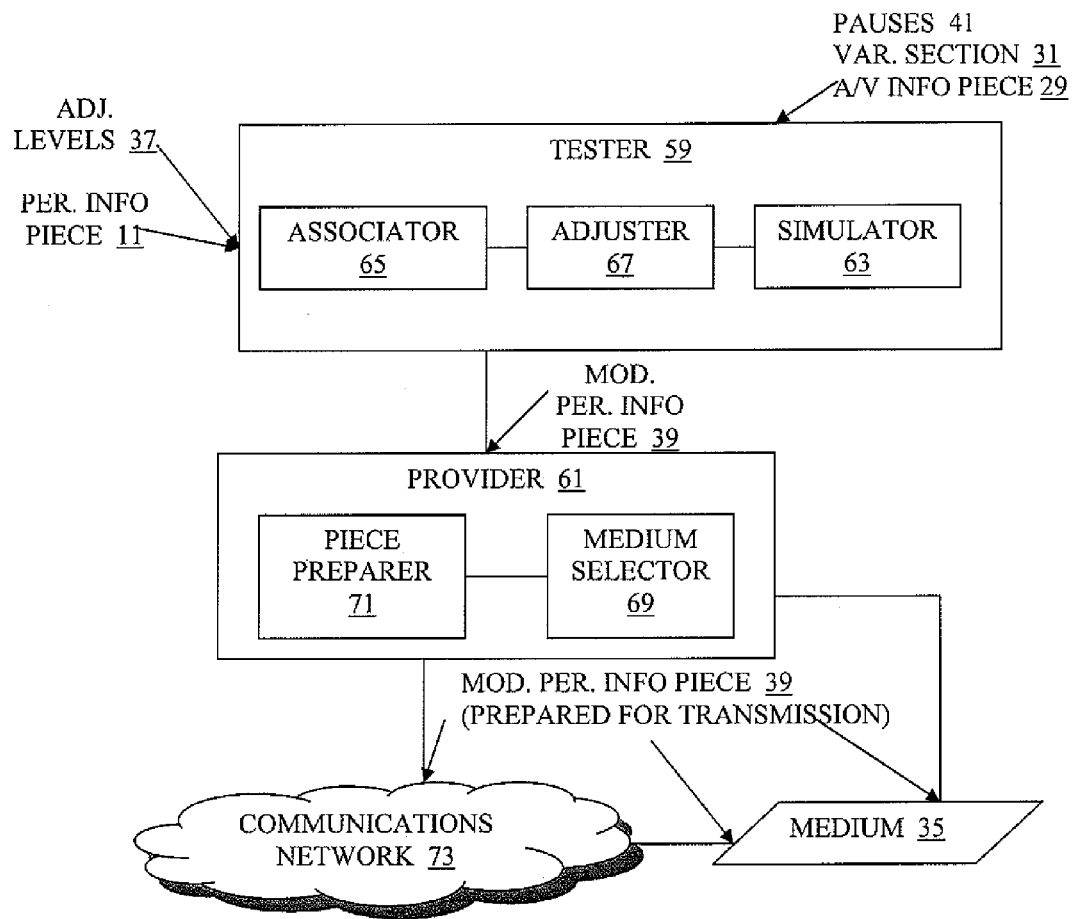
FIG. 2 is a schematic block diagram of an illustrative embodiment of further details of the system of the present invention.

Referring now to FIG. 2, tester 59 can include, but is not limited to including, associater 65 for associating adjustment levels 37 with personalized informational piece 11 and adjuster 67 that communicates electronically with simulator 63. Adjuster 67 can evaluate and modify, if necessary, and in conjunction with simulator 63, adjustment levels 37 of personalized informational piece 11 to create modified personalized informational piece 39. Adjuster 67 can evaluate and modify, if necessary, and in conjunction with simulator 63, pauses 41 between at least one variable section 31 and audio/ video informational piece 29 in modified personalized informational piece 39. Simulator 63 can optionally prescreen modified personalized informational piece 39. Provider 61 can include, but is not limited to including, medium selector 69 for selecting medium 35, and piece preparer 71 for preparing modified personalized informational piece 39 for transmission through medium 35. Medium 35 can include, but is not limited to including, e-mail, a personalized uniform resource locator link, and a telephone.

Figure 3A:
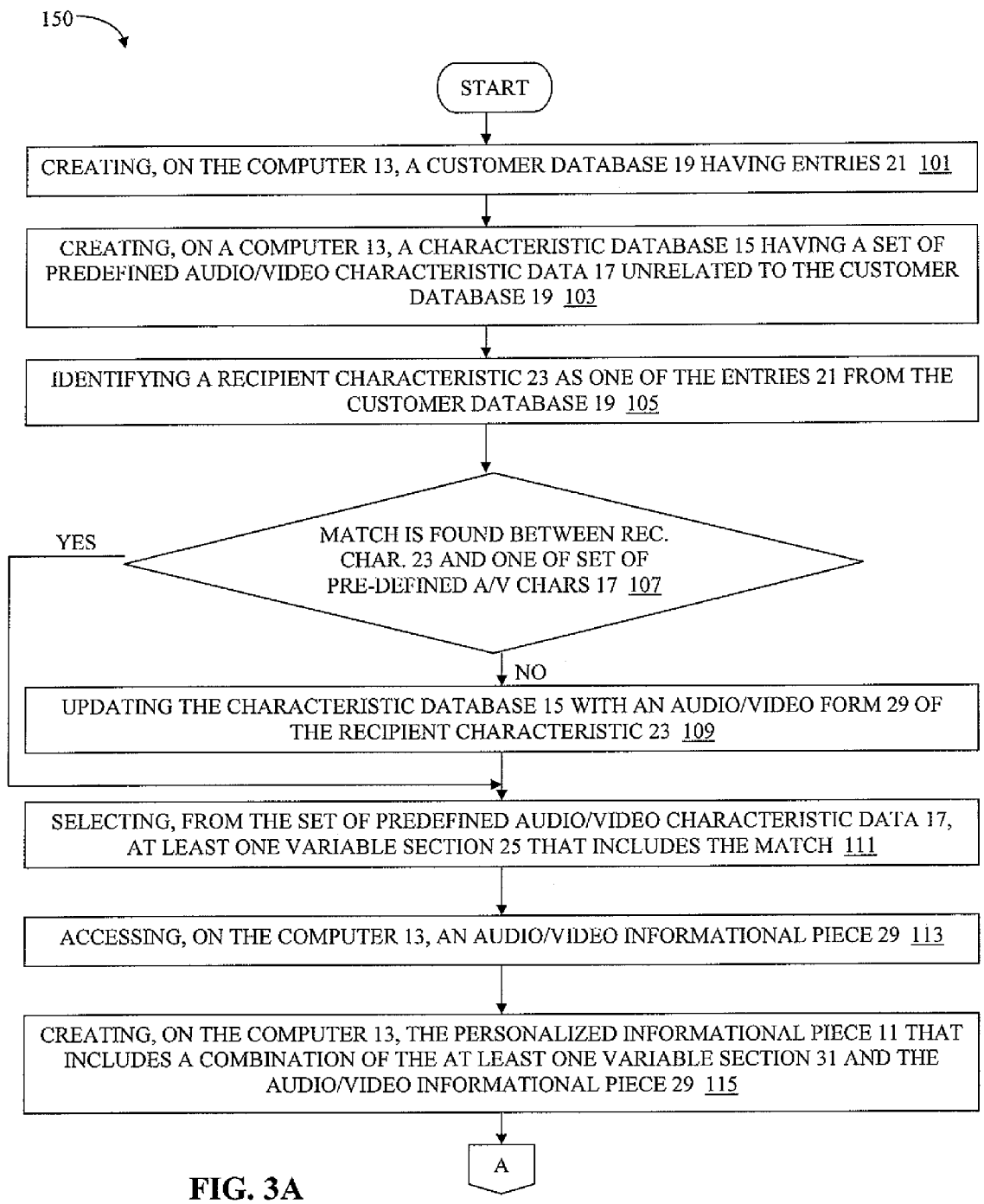
FIGS. 3A and 3B are flowcharts of an illustrative embodiment of the method of the present invention.
Figure 3B:
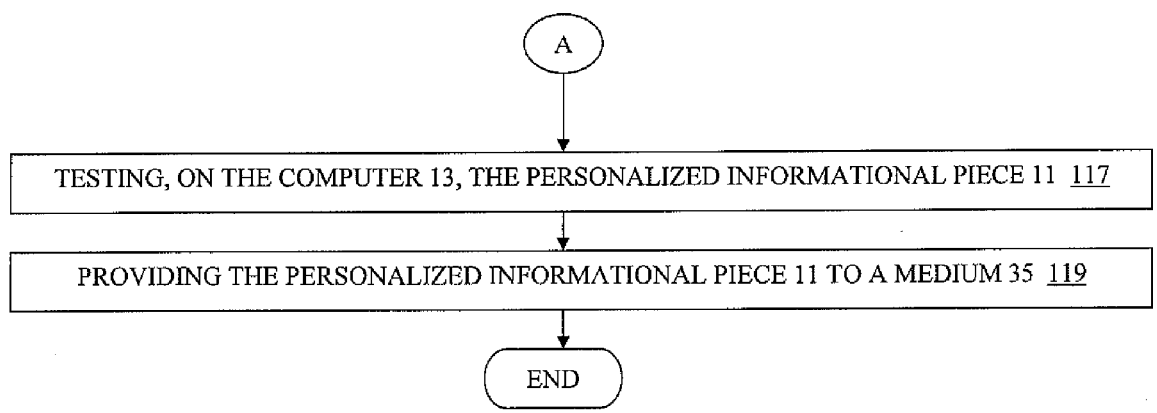

Referring now primarily to FIGS. 1, 3A, and 3B, method 150 (FIGS. 3A and 3B) for providing personalized informational piece 11 (FIG. 1) can include, but is not limited to including, the steps of (a) creating 101 (FIG. 3A), on computer 13 (FIG. 1), customer database 19 (FIG. 1) having entries 21 (FIG. 1), (b) creating 103 (FIG. 3A), on computer 13 (FIG. 1), characteristic database 15 (FIG. 1) having a set of predefined audio/video characteristic data 17 (FIG. 1) unrelated to customer database 19 (FIG. 1), (c) identifying 105 (FIG. 3A) recipient characteristic 23 (FIG. 1) as one of entries 21 (FIG. 1) from customer database 19 (FIG. 1), (d) selecting 111 (FIG. 3A), from the set of predefined audio/video characteristic data 17 (FIG. 1), at least one variable section 25 (FIG. 1) that includes a match between recipient characteristic 23 (FIG. 1) and one of the set of predefined audio/video characteristic data 17 (FIG. 1), if possible 107, (e) updating 109 (FIG. 3A) characteristic database 15 (FIG. 1) with audio/video form 28 (FIG. 1) of recipient characteristic 23 (FIG. 1) if the match is not found, and repeating step (d), (f) accessing 113, (FIG. 3A) on computer 13 (FIG. 1), audio/video informational piece 29 (FIG. 1), (g) creating 115 (FIG. 3A), on computer 13 (FIG. 1), personalized informational piece 11 (FIG. 1) that includes a combination of at least one variable section 31 (FIG. 1) and audio/video informational piece 29 (FIG. 1), (h) testing 117 (FIG. 3B), on computer 13 (FIG. 1), personalized informational piece 11 (FIG. 1), and (i) providing 119 (FIG. 3B) personalized informational piece 11 (FIG. 1) to medium 35 (FIG. 1). In method 150 (FIGS. 3A and 3B), predefined audio/video characteristic data 17 (FIG. 1) can optionally include, for example, recordings of first names and/or recordings of non-English first names. Further, customer database 19 (FIG. 1) can optionally include customer names, customer phone numbers, and customer e-mail addresses.

Continuing to refer primarily to FIGS. 1, 3A, and 3B, method 150 can optionally include the step of selecting audio/video informational piece 29 (FIG. 1) from a group consisting of an audio informational piece and a video informational piece. Further, the step of testing (FIG. 3B) can include, but is not limited to including, the steps of associating adjustment levels 37 (FIG. 1) with personalized informational piece 11 (FIG. 1), evaluating and modifying, if necessary, in simulator 43 (FIG. 1), adjustment levels 37 (FIG. 1) of personalized informational piece 11 (FIG. 1) to create modified personalized informational piece 39 (FIG. 1), evaluating and modifying, if necessary, in simulator 43 (FIG. 1), pauses 41 (FIG. 1) between at least one variable section 31 (FIG. 1) and audio/video informational piece 29 (FIG. 1) in modified personalized informational piece 39 (FIG. 1), and prescreening, in simulator 43 (FIG. 1), adjusted modified personalized informational piece 45 (FIG. 1). The step of testing can further optionally include the steps of selecting medium 35 (FIG. 1) from a group consisting of e-mail, a personalized uniform resource locator link, and a telephone, and preparing the adjusted modified personalized informational piece 45 (FIG. 1) for transmission through the selected medium. The step (FIG. 3B) of providing personalized information piece 33 (FIG. 1) to medium 35 (FIG. 1) can include, but is not limited to including, the steps of selecting medium 35 (FIG. 1) from a group consisting of e-mail, a personalized uniform resource locator link, and a telephone, and preparing personalized informational piece 11 (FIG. 1) for transmission through the selected medium. Method 150 can optionally include the step of creating, on the computer 13 (FIG. 1), personalized informational piece 33 (FIG. 1) that includes a combination of a pre-selected variable section and audio/video informational piece 29 (FIG. 1) if it is not possible to select, from predefined audio/video characteristic data 17 (FIG. 1), at least one variable section 25 (FIG. 1) that includes a match between the recipient characteristic 23 (FIG. 1) and one of the set of predefined audio/video characteristic data 17 (FIG. 1).

Referring primarily to FIGS. 3A and 313, method 150 (FIGS. 3A and 3B) can be, in whole or in part, implemented electronically. Signals representing actions taken by elements of system 100 (FIG. 1) can travel over at least one communications network 73 (FIG. 1). Control and data information can be electronically executed and stored on at least one computer-readable medium 35 (FIG. 1). The system can be implemented to execute on at least one computer node 13 (FIG. 1) in at least one communications network 73. Common forms of at least one computer-readable medium 35 can include, for example, but are not limited to, a floppy disk, a flexible disk, a hard disk, magnetic tape, or any other magnetic medium, a CDROM or any other optical medium, punched cards, paper tape, or any other physical medium with patterns of holes, a RAM, a PROM, and EPROM, a FLASH-EPROM, or any other memory chip or cartridge, a carrier wave, or any other medium from which a computer can read.

Although the invention has been described with respect to various embodiments, it should be realized this invention is also capable of a wide variety of further and other embodiments.

What is claimed is:

1. A method for providing a personalized informational piece comprising the steps of:
    (a) creating, on a computer, a customer database having entries;
    (b) creating, on the computer, a characteristic database having a set of predefined audio/video characteristic data unrelated to the customer database;
    (c) identifying a recipient characteristic as one of the entries from the customer database;
    (d) selecting, from the set of predefined audio/video characteristic data, at least one variable section that includes a match between the recipient characteristic and one of the set of predefined audio/video characteristic data, if possible;
    (e) updating the characteristic database with an audio/video form of the recipient characteristic if the match is not found, and repeating step (d);
    (f) accessing, on the computer, an audio/video informational piece;
    (g) creating, on the computer, the personalized informational piece that includes a combination of the at least one variable section and the audio/video informational piece;
    (h) testing, on the computer, the personalized informational piece; and
    (i) providing the personalized informational piece to a medium.

2. The method as in claim 1 wherein the predefined audio/video characteristic data includes recordings of first names.

3. The method as in claim 1 wherein the predefined audio/video characteristic data includes recordings of non-English first names.

4. The method as in claim 1 wherein the customer database includes customer names, customer phone numbers, and customer e-mail addresses.

5. The method as in claim 1 further comprising the step of:
selecting the audio/video informational piece from a group consisting of an audio informational piece and a video informational piece.

6. The method as in claim 1 wherein said step of testing comprises the steps of:
associating adjustment levels with the personalized informational piece;
evaluating and modifying, if necessary, in a simulator, the adjustment levels of the personalized informational piece to create a modified personalized informational piece;
evaluating and modifying, if necessary, in the simulator, pauses between the at least one variable section and the audio/video informational piece in the modified personalized informational piece; and
prescreening, in the simulator, the adjusted modified personalized informational piece.

7. The method as in claim 6 further comprising the steps of:
selecting the medium from a group consisting of e-mail, a personalized uniform resource locator link, and a telephone; and
preparing the adjusted modified personalized informational piece for transmission through the selected medium.

8. The method as in claim 1 wherein said step of providing the personalized information piece to the medium comprises the steps of:
selecting the medium from a group consisting of e-mail, a personalized uniform resource locator link, and a telephone; and
preparing the personalized informational piece for transmission through the selected medium.

9. The method as in claim 1 further comprising the step of:
creating, on the computer, the personalized informational piece that includes a combination of a pre-selected variable section and the audio/video informational piece if it is not possible to select, from the set of predefined audio/video characteristic data, at least one variable section that includes a match between the recipient characteristic and one of the set of predefined audio/video characteristic data.

10. A system for providing a personalized informational piece comprising:
a computer;
a customer database electronically communicating with said computer, said customer database including entries;
a characteristic database electronically communicating with said computer, said characteristic database including a set of predefined audio/video characteristic data unrelated to said customer database;
an identifier executing within said computer for identifying a recipient characteristic as one of said entries from said customer database;
a match finder executing within said computer for selecting, from said set of predefined audio/video characteristic data, at least one variable section that includes a match between said recipient characteristic and one of said set of predefined audio/video characteristic data, if possible;
a database manager executing within said computer for updating said characteristic database with an audio/video form of said recipient characteristic if said match is not found;
a piece creator executing within said computer for accessing an audio/video informational piece and for creating said personalized informational piece that includes a combination of said at least one variable section and said audio/video informational piece;
a tester executing within said computer for testing said personalized informational piece; and
a provider executing within said computer for providing the personalized informational piece to a medium, said provider having electronic communications with said medium.

11. The system as in claim 10 wherein said predefined audio/video characteristic data includes recordings of first names.

12. The system as in claim 10 wherein said predefined audio/video characteristic data includes recordings of non-English language first names.

13. The system as in claim 10 wherein said customer database includes customer names, customer phone numbers, and customer e-mail addresses.

14. The system as in claim 10 wherein said audio/video informational piece is selected from a group consisting of an audio informational piece and a video informational piece.

15. The system as in claim 10 wherein said tester comprises:
an associater for associating adjustment levels with the personalized informational piece; and
an adjuster in electronic communication with a simulator, said adjuster for evaluating and modifying, if necessary, in conjunction with said simulator, said adjustment levels of said personalized informational piece to create a modified personalized informational piece, said adjuster for evaluating and modifying, if necessary, in conjunction with said simulator, pauses between said at least one variable section and said audio/video informational piece in said modified personalized informational piece, wherein said simulator is for prescreening said modified personalized informational piece.

16. The system as in claim 15 wherein said provider comprises:
a medium selector for selecting said medium from a group consisting of e-mail, a personalized uniform resource locator link, and a telephone; and
a piece preparer for preparing said modified personalized informational piece for transmission through said medium.

17. A non-transitory computer readable medium containing instructions to execute the method as in claim 1.

18. A computer in a communications network for executing the method as in claim 1.

19. A communications network having a computer for executing the method as in claim 1.

* * * * *